J. C. MITCHELL, G. C. BARTRAM & A. M. HIRSH.
PIPE JOINT.
APPLICATION FILED JAN. 7, 1918.
1,293,615.
Patented Feb. 4, 1919.
2 SHEETS—SHEET 1.
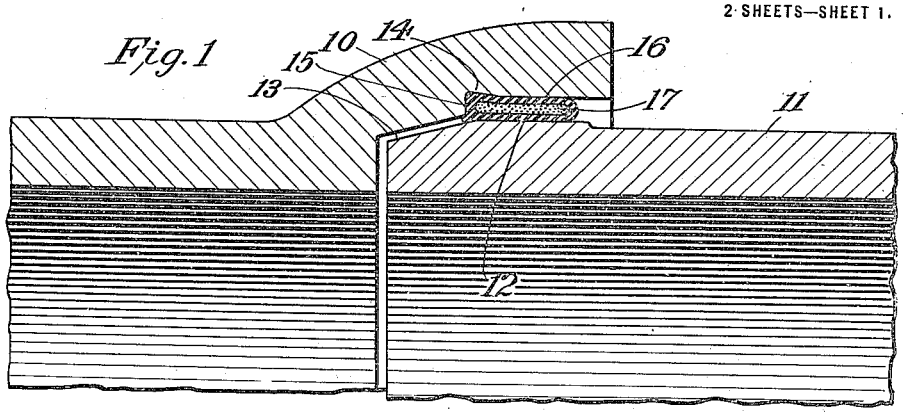
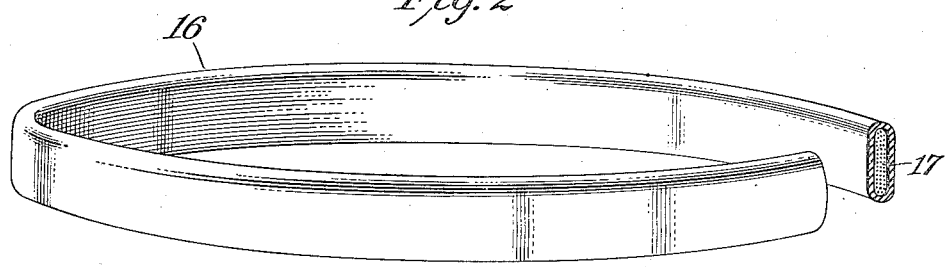
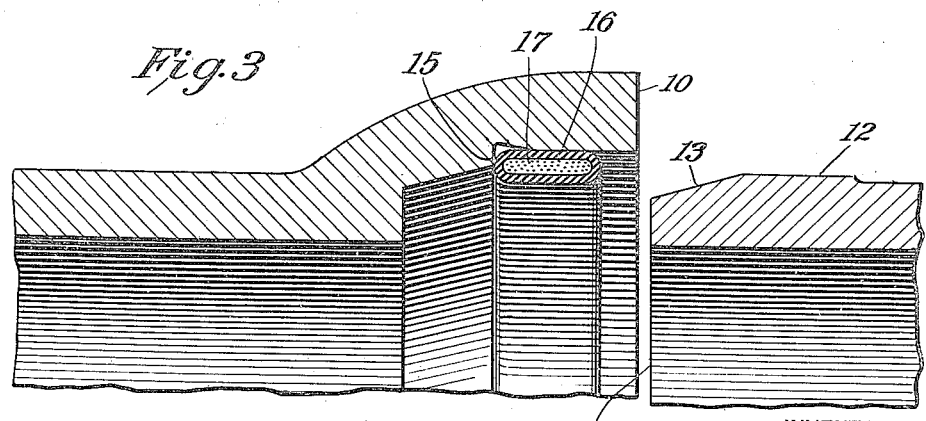
INVENTOR
BY
ATTORNEYS J. C. MITCHELL, G. C. BARTRAM & A. M. HIRSH.
PIPE JOINT.
APPLICATION FILED JAN. 7, 1918.

1,293,615.

Patented Feb. 4, 1919.

UNITED STATES PATENT OFFICE.

JOHN C. MITCHELL AND GEORGE C. BARTRAM, OF EAST ORANGE, AND ALLAN M. HIRSH, OF MONTCLAIR, NEW JERSEY, ASSIGNORS TO LOCK JOINT PIPE COMPANY, OF AMPERE, NEW JERSEY, A CORPORATION OF NEW JERSEY.

PIPE-JOINT.

1,293,615.  Specification of Letters Patent.  Patented Feb. 4, 1919.

Application filed January 7, 1918. Serial No. 210,743.

*To all whom it may concern:*

Be it known that we, JOHN C. MITCHELL and GEORGE C. BARTRAM, residing at East Orange, county of Essex, and State of New Jersey, and ALLAN M. HIRSH, residing at Montclair, county of Essex, and State of New Jersey, being citizens of the United States, have invented certain new and useful Improvements in Pipe-Joints, of which the following is a full, clear, and exact description.

In many forms of pipe, including not only those of metal but also those of concrete, it is very desirable to have a perfectly water-tight joint. Heretofore it has been common practice to make the joints water-tight by the use of lead or other material poured into the joint and subsequently calked, tamped, compressed or otherwise worked to force the packing material into sealing contact with the surfaces of the pipe sections. This method is effective within certain limits, but suffers from disadvantages which are in general well understood, among which may be mentioned the comparatively large quantity of packing material sometimes required (as much as twenty or more pounds of lead in a twelve-inch cast iron pipe), the difficulty and labor of tamping or calking the packing material especially in a trench containing water, as is often the case, and the extreme liability of the joint being materially impaired, and even ruined, by the contraction and expansion of the pipe occasioned by temperature changes or other influences.

Confronted with these difficulties in laying pipe for a variety of purposes which require them to have water-tight joints, we have devised a form of joint which meets fully all practical requirements and which is far less costly in time, labor and material than any other joint of which we have knowledge.

The gist of our invention resides in the use of a resilient deformable gasket of annular form which may be made of various materials, as for example fibrous material, rubber, copper or lead. In the case of copper or lead the gasket is preferably in the shape of an annulus of copper or lead pipe filled with material of a resilient nature, such as oakum, hemp, or jute. The gasket is placed inside the bell end of one of the pipe sections in an annular recess therein provided for that purpose, terminating in a circumferential abutment at the junction of which with said recess a circumferential groove is formed in the wall of the recess. The tapered front portion of the spigot end of the other pipe section is then inserted into the bell end of the bell pipe section, entering the annular gasket contained therein, and the two pipe sections are then forced together thereby compressing and flattening the gasket radially, pressing it tightly against the cylindrical wall of the recess and also against the abutment and at the same time causing it by the "flow" of the material of which the gasket is composed, under the pressure exerted, to enter and tightly fill the circumferential groove in the wall of the recess at the junction of the latter with the abutment, thus anchoring the gasket in place beyond possibility of after-disturbance.

The preferred method of practising the invention is illustrated in the accompanying drawing, in which—

Figure 1 is a sectional view showing the invention applied to metal pipe, say cast iron.

Fig. 2 is a perspective view, partly in section, illustrating the preferred form of gasket or packing.

Fig. 3 is a sectional view showing the deformable gasket in place in the bell end, with the spigot end ready to be inserted and forced home.

Like reference characters indicate corresponding parts in all the figures.

Figure 4:
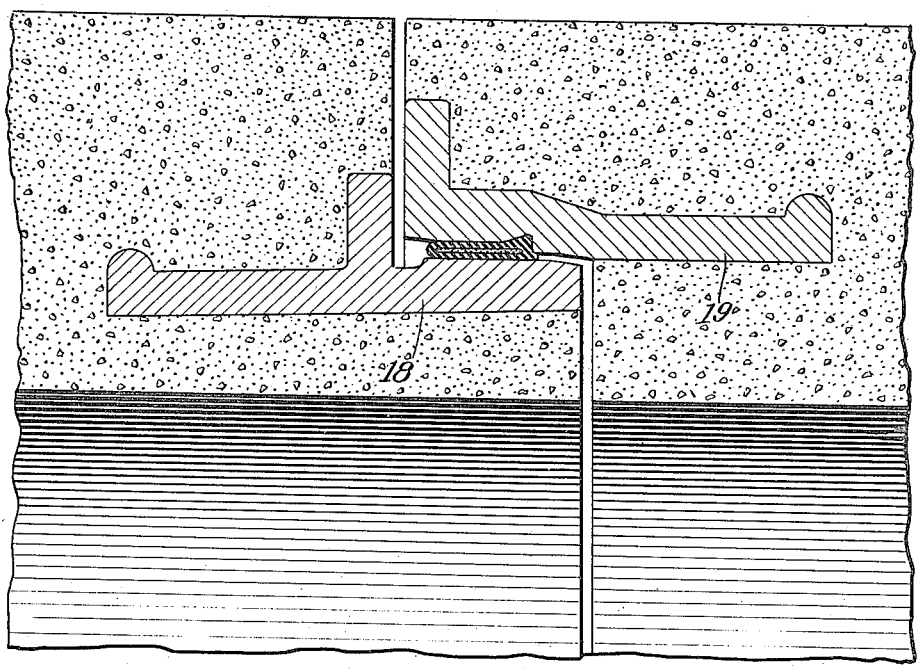
Fig. 4 is a sectional view showing the invention applied to concrete pipe sections with end rings.

In the form of pipe shown in Figs. 1 and 3, the bell end is formed with an annular recess 10, cylindrical in contour and co-axial with the pipe, terminating at its inner end in a circumferential abutment 15 at the junction of which with the cylindrical wall of the recess 10 is a circumferential groove 14 formed in the wall of the recess, and of suitable contour. In this instance, the two walls of the groove meet at an angle to one another, the one wall being on the prolongation of the face of the abutment against which the inner end of the gasket will rest and the other wall extending outwardly toward the mouth of the bell end at an incline until it meets and merges into the cylindrical wall of the recess 10. The spigot end 11 has a tapered front section 13, back of which is a cylindrical portion 12.

The gasket or packing 16, Fig. 2, consists of a length of lead or copper pipe filled with compressible resilient material 17 (preferably jute, hemp or oakum) and then flattened to oblong shape in cross-section as shown in Fig. 2, after which it is bent to the form of an annulus and its ends are soldered together.

The flattening of the gasket greatly diminishes the cross sectional area of its interior space, and the fibrous or other resilient packing or filling therein is therefore compressed. If there is sufficient of the resilient material in the ring to start with, the compression described gives the lead walls a certain resiliency, so that when the latter are pressed further together and the pressure relieved they will spring out again. In other words, the gasket walls have more or less spring. This is a highly advantageous feature.

In making the joint the gasket is placed in the annular cylindrical recess 10 the bell with its inner end resting against the abutment. The thickness of the gasket is greater than the depth of the recess so that it protrudes inwardly beyond the abutment into the bore of the bell end as seen in Fig. 3. The spigot end of the other section 11 is then inserted, the tapered front section 13 of the spigot end (when the parts are proportioned as indicated in the drawing) meeting the gasket at about where the lead line from the reference character 13 meets the tapered section in Fig. 3. The two pipe sections are now forced together. This flattens the gasket still further upon the resilient compressible filling 17 which it contains.

The compression of the gasket between the wall of the cylindrical recess 10 and spigot end of the pipe increases with the advance of the tapered front section 13, through the gasket, reaching its maximum at the point where the tapered section 13 merges into the cylindrical section 12 of the spigot end, the movement of the advancing tapered section acting to crowd the material of which the gasket is composed before it, or in other words to cause the "flow" of that material in a direction to crowd it against the abutment, and to "flow" laterally and outwardly at this point to tightly fill the circumferential groove 14 at the junction of the wall of the recess 10 with the abutment, any surplus of the thus-flowed material beyond what is needed for this purpose passing over the inner edge of the abutment 15, and inwardly between the adjoining wall of the pipe and the tapered front spigot section as indicated in Fig. 1.

All this is effected by the action of the taper front section of the spigot end, the following cylindrical section 12 thereof acting to consolidate and finish the joint and in effect to machine the internal face of the gasket by which it is encircled and with which it is in intimate contact.

In order to minimize or eliminate tearing or cutting of the lead as one or the other or both of the spaced cylindrical or parallel surfaces of the pipe ends slide thereon, such surfaces are made as smooth as conveniently may be, machining being resorted to if necessary or desirable.

The joint described has been found capable of withstanding very high internal pressures. In fact the internal pressure tends to crowd the gasket more firmly and tightly into the groove 14 and against the faces thereof, as well as against the surface of the male or spigot end, so that the net result is not to loosen the joint but rather the contrary. At the same time the parallel surfaces of the coöperating ends of the pipe can have relative sliding motion, axially, to a considerable extent without the slightest impairment of the joint,—in fact, the joint can sustain a far greater movement of this sort than would be occasioned by the normal expansion and contraction of the pipe in actual use, the resiliency of the gasket compensating for any irregularities and taking up all lost motion between the parts.

Figure 5:
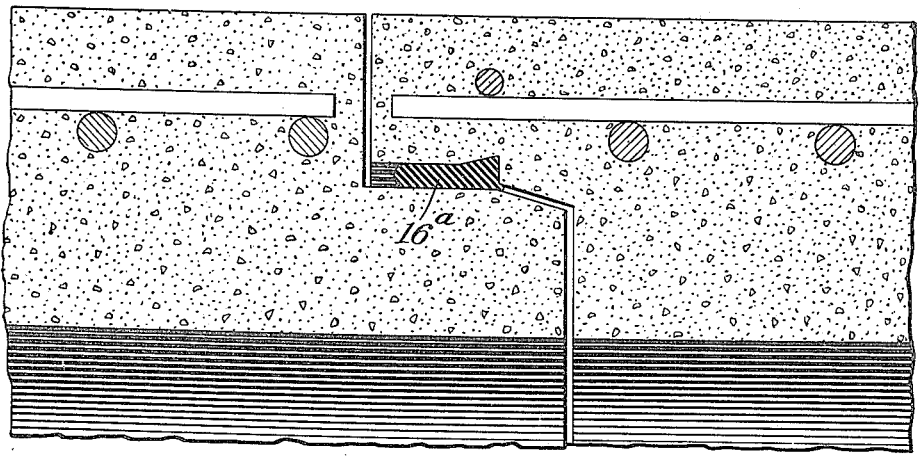
Fig. 5 is a like view wherein the sections are without end rings.

In the case of concrete pipe the adjoining ends may be provided with iron or steel bell spigot rings, as 18, 19, in Fig. 4, around which the pipe sections are molded. These may, however, be omitted, as in Fig. 5. In the latter figure a solid gasket 16ª, is shown, which may be of vulcanized soft rubber, or other equivalent deformable resilient material.

In all cases however it will be noted that the annular groove 14 is formed in the wall of the recess in the bell end of the pipe at the junction of the cylindrical wall of the recess 10 and the circumferential abutment 15, and is localized and substantially confined to that point; and this we believe to be new with us.

The size, weight and cost of the packing material used in our improved joint may be judged from the fact that we use only 10% of lead as compared with the present accepted and standard method of making joints in cast iron pipes.

We claim:

1. In a pipe joint the combination of a bell pipe end having a cylindrical recess coaxial with the bore of the pipe terminating at its inner end in a circumferential abutment, and a circumferential groove in the wall of said recess at the junction of the same with said abutment; a spigot pipe end having a tapered front section and a cylindrical portion back of said front section; and a deformable resilient, compressible, annular gasket seated in said cylindrical recess in said bell end and adapted to be held flattened and compressed between the said cylindrical surfaces, and to be crowded forward against the said abutment and outwardly into said groove at the junction of said abutment with the cylindrical wall of said recess, by the forcible insertion of the spigot end into the bell end.

2. In a pipe joint the combination of a bell pipe end having a cylindrical recess coaxial with the bore of the pipe, terminating at its inner end in a circumferential abutment, and a circumferential groove formed in the wall of said recess at the junction of said wall with the abutment; a spigot pipe end having a tapered front section and a cylindrical portion back of said front section; and an annular, tubular, malleable-lead gasket containing a resilient compressible filler, seated in said cylindrical recess in the bell end and adapted to be held flattened and compressed between the said cylindrical surfaces, and to be crowded forward against the abutment, and outwardly into the said groove at the junction of the abutment with the cylindrical wall of said recess, by the forcible insertion of the spigot end into the bell end.

In testimony whereof we hereunto affix our signatures.

JOHN C. MITCHELL.
GEORGE C. BARTRAM.
ALLAN M. HIRSH.